United States Patent Office 3,532,305
Patented Oct. 6, 1970

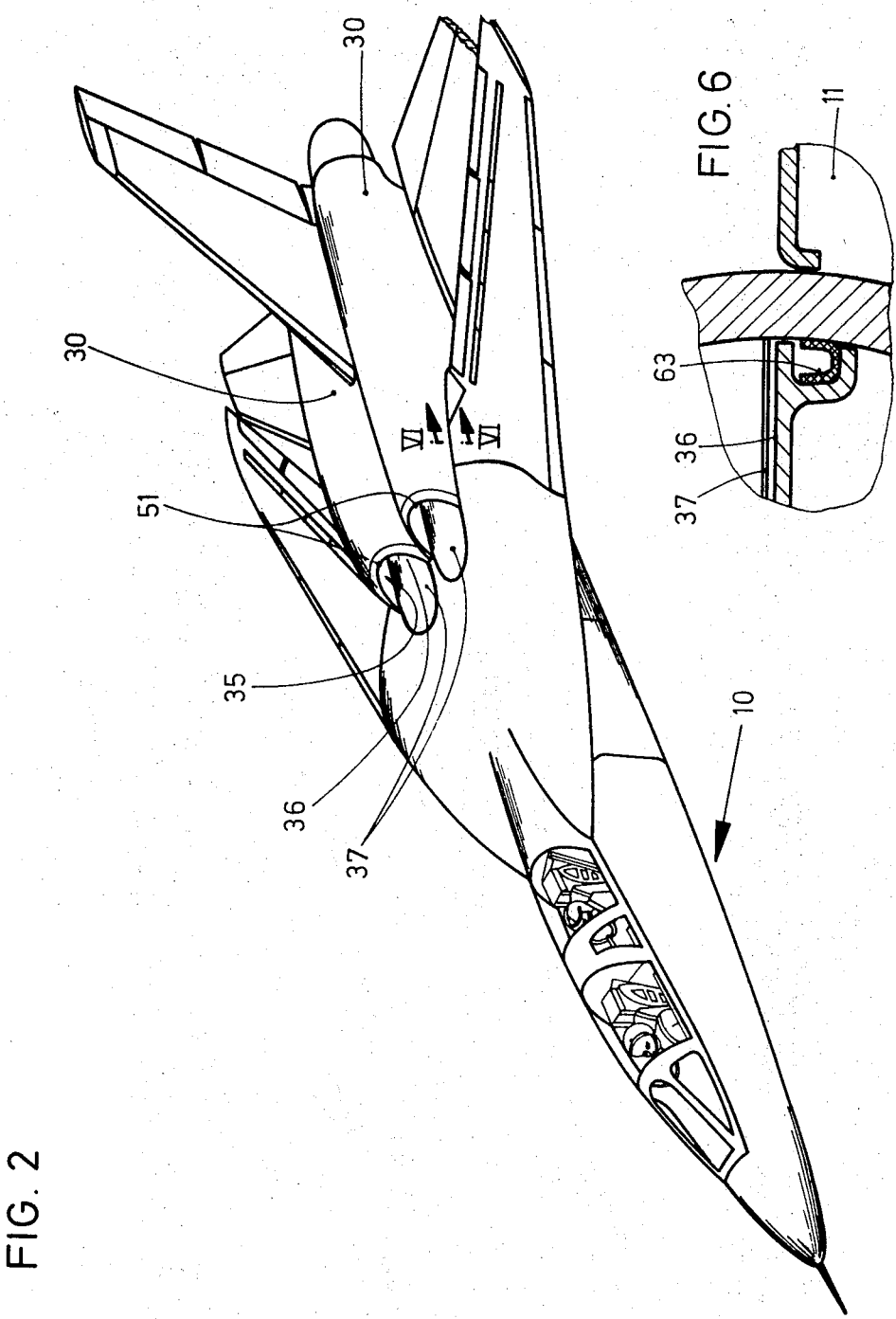

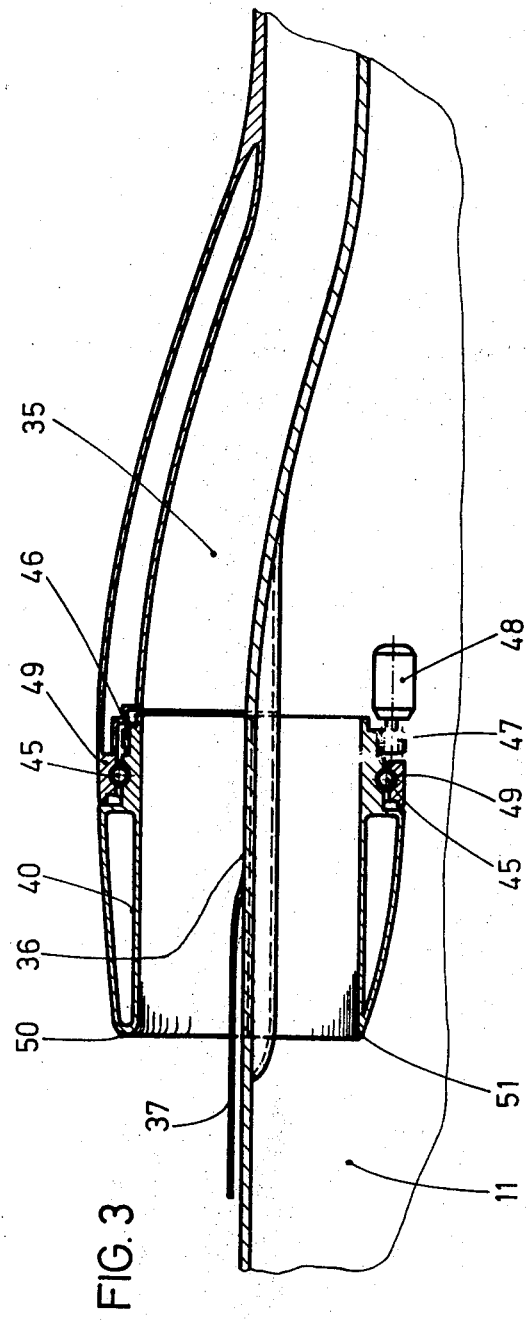
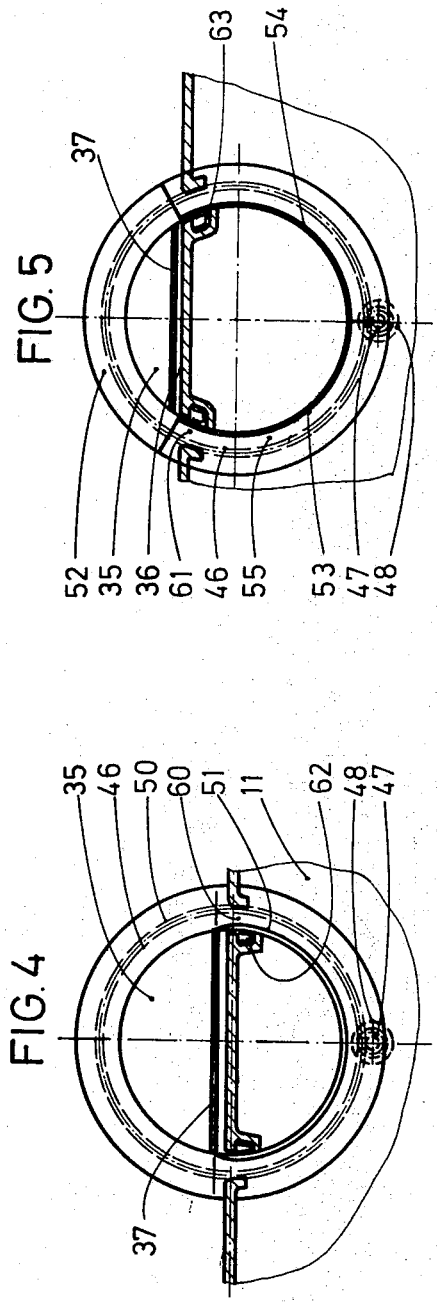

3,532,305
VARIABLE PROFILE AIR INLET LIP FOR AN
AIRCRAFT ENGINE
Gero Otto, Madelung, Munich, Germany, assignor to
Entwicklungsring Sud GmbH., Munich, Germany
Filed Oct. 2, 1968, Ser. No. 764,539
Claims priority, application Germany, Oct. 9, 1967,
1,531,401
Int. Cl. B64d 29/04
U.S. Cl. 244—53          5 Claims

ABSTRACT OF THE DISCLOSURE

An apparatus for varying the profile of the lip defining the air intake orifice of a jet aircraft engine. A plurality of cylindrical segments are positioned upon the cowl of the engine. The leading edges of each of the segments displays a distinctly profiled lip. A portion of the cowl is positioned within the fuselage. This cowl, which accommodates the various inlet lips, is selectively rotated by means of a gear drive and motor. Rotation of cowl selectively places one of the several inlet lips into position in accordance with prevailing flight conditions.

BACKGROUND OF THE INVENTION

This invention generally relates to a variable profile air inlet lip, particularly suitable for use for the intake orifice of a jet aircraft engine.

In accordance with the illustrated embodiment the inlet lip is adapted to the flying speed of the aircraft so as to obtain maximum operational efficiency.

In this regard, it is desirable that the inlet of the engine intake orifice lip displays maximum possible rounding during takeoff and at low flying speeds. During such flight conditions air flows into the engine not only from the forward direction but from all sides of the intake orifice. It is preferable that, as the flying speed is increased, the optimum radius of curvature of the edge of the inlet lip gradually decreases until the supersonic speeds a sharp edged inlet lip is most desirable.

Various types of variable inlet lips have been previously suggested. For example, one such suggestion concerns an inflatable lip. This arrangement, however, creates considerable design problems in that the structure providing such features is frequently subject to damage during supersonic flight.

The illustrated embodiment includes means for selectively varying the forward edge of the air intake nozzle with respect to flight conditions so as to obtain maximum operational efficiency. A plurality of variously profiled inlet lips are arranged as cylindrical segments upon the engine cowl. Each of the lip profiles may be selectively placed into position by rotation of the cowl in a manner to be subsequently described. In accordance with the illustrated embodiment, a portion of the cowl is positioned within the fuselage. The cowl, which accommodates the various inlet lips, is selectively rotated by means of a gear drive. In addition to the inlet lips, other supersonic diffusers may be used. During supersonic flight, a sharp inlet lip, which may be ceramic coated to provide the necessary heat resistance, is rotated into position. Various other features and advantages will become apparent with reference to the following description and accompanying drawings which show an illustrated embodiment of the invention.

BRIEF DESCRIPTION OF THE DRAWINGS

FIG. 2 is a pictorial view of the aircraft illustrated in FIG. 1, during supersonic flight with the wings thereof swept back and with the forward edges of the engine inlets forming a sharp edged lip.

FIG. 3 is a partial cross sectional view taken along the line III—III of FIG. 1.

FIG. 4 is a partial cross section view along the line IV—IV of FIG. 1 illustrating a cowl having two cylindrical segments displaying two distinct lip profiles.

FIG. 5 is a cross sectional view taken along the line IV—IV of FIG. 1 illustrating a cowl having three cylindrical segments displaying three different lip profiles; and FIG. 6 is a partial cross sectional view taken along the line VI—VI of FIG. 2.

DESCRIPTION OF THE PREFERRED EMBODIMENT

Figure 1:
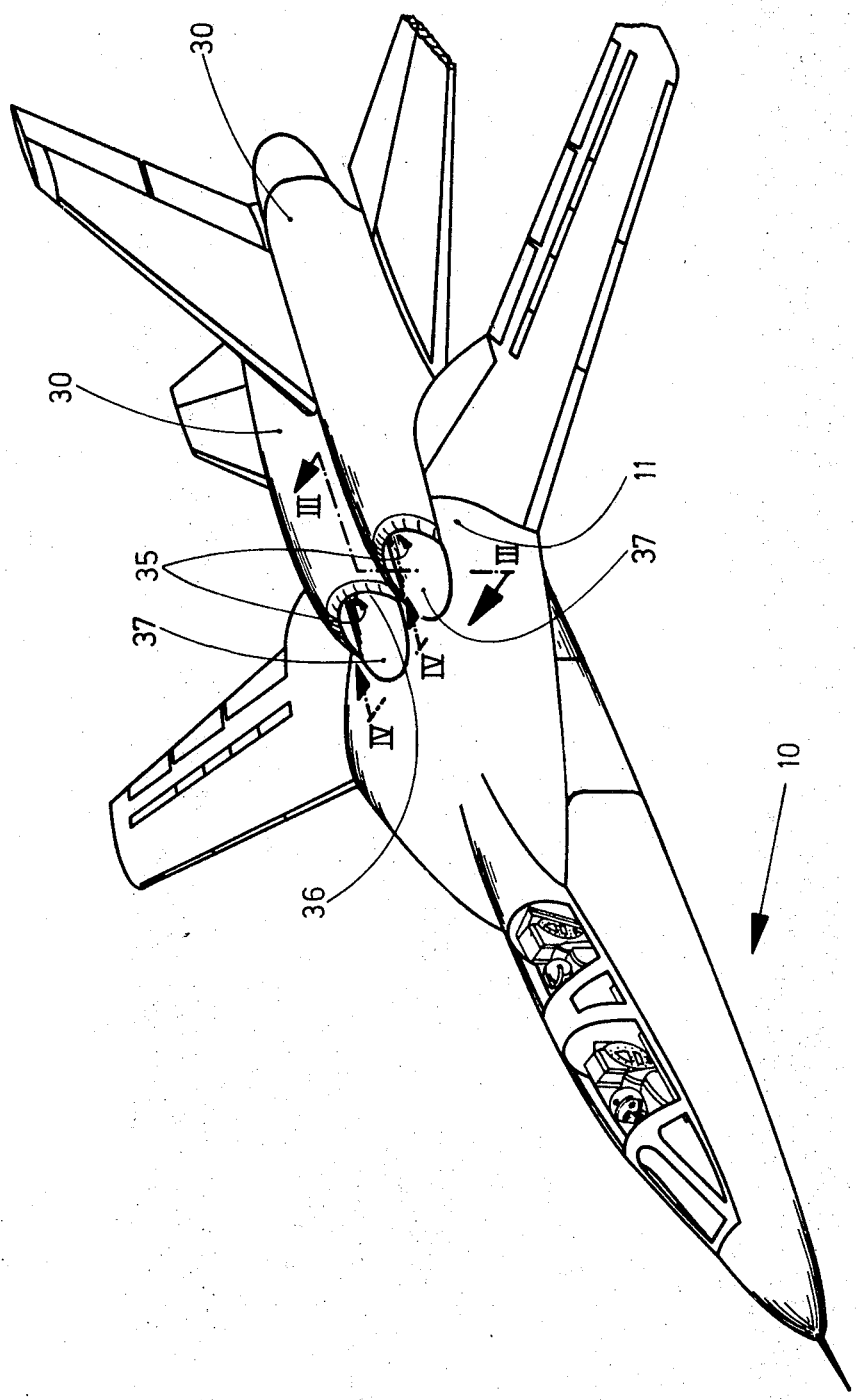
FIG. 1 is a pictorial view of a jet aircraft during takeoff having an engine displaying considerably rounded air intake lips.

With particular reference to the drawings, a jet aircraft 10 is provided with a pair of rotatable inlet lips 50 and 51. Each of the inlet lips 50 and 51 define different inlet lip profiles. The lips are arranged about a cowl 40 which is pivoted within an annular housing 49 rotatable by means of a bearing 45.

As illustrated, a portion of the cowl 40 projects into the fuselage 11. Secured to the outer surface of cowl 40 is a rim gear 46. The rim gear 46 meshes with a pinion 47 mounted upon the drive shaft of a motor 48. In this way actuation of the motor 48 produces corresponding rotational movement of the cowl 40. During flight the inlet lip 50 may be selectively replaced by the more sharply edged inlet lip 51.

The inlet lips 50 and 51 are semicircularly shaped whereas in accordance with the embodiment of FIG. 5 the ring shaped inlet lips 52, 53 and 54 subtend a 120 degree arc.

In accordance with the arrangement illustrated in FIG. 5, one of three inlet lips may be selected. That is a round lip 52, a sharp lip 53, or a modified lip 54 may be selected. The lips may be furnished with a heat resistant coating 55 for example as ceramic.

The fuselage defines a pair of openings 60 and 61 through which the cowl 40 projects into the aircaft fuselage. To ensure proper sealing a pair of seals 62 and 63 are provided. Thus, the inlet lips defining the air intakes orifices for engine ducts 35 may selectively be adapted to prevailing flight conditions.

If desired, supersonic diffusers may be provided at the lower wall 36 of the inlet ducts 36. The engines are indicated by the numeral 30 and the boundary layer deflectors by numeral 37.

I claim:
1. A air intake apparatus for varying the air inlet lip profile of an aircraft jet engine, comprising a cowl, a plurality of distinctly shaped inlet lip segments on said cowl ranging from a rounded cross-sectional configuration to a sharp-edge cross-sectional configuration, said distinctly shaped lips being sequentially arranged to form in combination the entire inlet lip profile, and means for selectively placing at least one of said segments into air capturing relationship to said engine in accordance with prevailing flight conditions.

2. An air intake apparatus according to claim 1 wherein a portion of the engine cowl is arranged within the fuselage of the aircraft.

3. An air intake apparatus according to claim 2, characterized in that means are provided for rotating said cowl about its longitudinal axis.

4. An air intake apparatus according to claim 3 wherein said cowl rotating means includes a rim gear formed about the outer circumference of said cowl, a motor including a drive shaft, and a pinion gear upon said motor drive shaft and meshing with said rim gear.

5. An air intake apparatus in accordance with claim 4 which further includes supersonic diffusers.

References Cited

UNITED STATES PATENTS

| | | | |
|---|---|---|---|
| 2,396,598 | 3/1946 | Neumann et al. | 137—15.1 X |
| 2,780,913 | 2/1957 | Nicks | 138—45 |
| 2,876,621 | 3/1959 | Bogert et al. | 244—53 |
| 2,970,431 | 2/1961 | Harshman | 244—53 |

MILTON BUCHLER, Primary Examiner

J. E. PITTENGER, Assistant Examiner

U.S. Cl. X.R.

137—15.1